(12) United States Patent
Schmale

(10) Patent No.: US 6,966,598 B2
(45) Date of Patent: Nov. 22, 2005

(54) ADJUSTING DEVICE FOR A VEHICLE SEAT

(75) Inventor: Uwe Schmale, Huckeswagen (DE)

(73) Assignee: Johnson Controls Technology Company, Plymouth, MI (US)

(*) Notice: Subject to any disclaimer, the term of this patent is extended or adjusted under 35 U.S.C. 154(b) by 36 days.

(21) Appl. No.: 10/362,708

(22) PCT Filed: Aug. 23, 2001

(86) PCT No.: PCT/EP01/09732
§ 371 (c)(1),
(2), (4) Date: Mar. 20, 2003

(87) PCT Pub. No.: WO02/20303
PCT Pub. Date: Mar. 14, 2002

(65) Prior Publication Data
US 2003/0178877 A1 Sep. 25, 2003

(30) Foreign Application Priority Data
Sep. 5, 2000 (DE) .................................... 200 15 299 U
Jan. 30, 2001 (DE) .................................... 201 01 529 U

(51) Int. Cl.[7] ................................................ B60N 2/10
(52) U.S. Cl. .............................. 296/65.08; 296/65.05; 297/344.15; 297/344.17
(58) Field of Search ......................... 296/65.05, 65.08, 296/65.09; 297/337–338, 344.13, 344.14, 344.15, 344.17

(56) References Cited

U.S. PATENT DOCUMENTS

| | | | |
|---|---|---|---|
| 2,942,647 A | | 6/1960 | Pickles |
| 3,022,035 A | | 2/1962 | Pickles |
| 4,128,225 A | | 12/1978 | Klüting et al. |
| 5,882,061 A | * | 3/1999 | Guillouet ................. 296/65.05 |
| 5,979,985 A | | 11/1999 | Bauer et al. |
| 6,186,572 B1 | * | 2/2001 | Oh .......................... 296/65.05 |
| 6,234,553 B1 | * | 5/2001 | Eschelbach et al. ..... 296/65.14 |
| 6,382,491 B1 | * | 5/2002 | Hauser et al. ........... 296/65.05 |
| 6,601,900 B1 | * | 8/2003 | Seibold ................... 296/65.09 |

FOREIGN PATENT DOCUMENTS

| | | |
|---|---|---|
| DE | 25 27 047 | 1/1977 |
| DE | 3222386 A | 2/1984 |
| DE | 4010451 C2 | 10/1991 |
| DE | 19758237 A1 | 7/1998 |
| EP | 0 235 793 B1 | 7/1992 |
| EP | 0 445 528 B1 | 9/1993 |

OTHER PUBLICATIONS

PCT/EP01/09732 PCT International Search Report, Aug. 23, 2001.
Japan Abstract, JP 56–157634, Apr. 12, 1981, Akazaw Terumi; (Toyo Sheet KK).

* cited by examiner

Primary Examiner—Stephen Gordon
(74) Attorney, Agent, or Firm—Foley & Lardner LLP

(57) ABSTRACT

The present invention concerns an apparatus for adjusting the vertical and longitudinal position and the inclination of a pivotable seat part (2) of a vehicle seat (1) relative to a floor structure (4) of the vehicle, having a linkage that encompasses a linkage part, constituted by at least one articulated rectangle (ABCD), that has a base (AB), two rockers (BC, AD), and a coupler (CD). The base (B)is arranged in a plane extending substantially parallel to a longitudinal seat axis (X—X).The rockers (BC, AD)are pivotable about rotation axes extending substantially parallel to transverse seat axis. The linkage encompasses two linkage parts, each constituted by at least one articulated rectangle (ABCD;CDEF), that each have a base (AB,CD), two rockers (BC,AD;DE,CF),and a coupler (DC,EF). The base (AB)of the first linkage part is fixed with respect to the floor structure (4)of the vehicle, the coupler (CD)of the first linkage part constitutes the base (CD)of the second linkage part, the coupler (EF)of the second linkage part is fixed with respect to the seat part (2), and a rocker (DE,CF)of the second linkage part is coupled in constrainedly kinematic fashion to a rocker (AD)of the first linkage part.

43 Claims, 4 Drawing Sheets

ADJUSTING DEVICE FOR A VEHICLE SEAT

CROSS-REFERENCE TO RELATED PATENT APPLICATIONS

Germany Priority Application 200 15 299.8, filed Sep. 5, 2000 including the specification, drawings, claims and abstract, is incorporated herein by reference in its entirety. Germany Priority Application 201 01 529.3, filed Jan. 30, 2001 including the specification, drawings, claims and abstract, is incorporated herein by reference in its entirety. This application is a National Stage of U.S. Application PCT/EP01/09732, filed Aug. 23, 2001, incorporated herein by reference in its entirety.

BACKGROUND OF THE INVENTION

The invention concerns an apparatus for adjusting the vertical and longitudinal position and the inclination of a pivotable seat part of a vehicle seat relative to a floor structure of the vehicle, having a linkage that encompasses a linkage part, constituted by at least one articulated rectangle, that has a base, two rockers, and a coupler, the base being arranged in a plane extending substantially parallel to a longitudinal seat axis, and the rockers being pivotable about rotation axes extending substantially parallel to a transverse seat axis. The invention furthermore concerns a vehicle seat having an apparatus of this kind.

SUMMARY OF THE INVENTION

In order to make possible an optimum seating position in each case for the various users of a vehicle seat, in particular the drivers of a motor vehicle, adjustment of the vertical and longitudinal position and the inclination of the vehicle seat relative to the vehicle floor is indispensable.

DETAILED DESCRIPTION OF THE PREFERRED EMBODIMENTS

In a vehicle coordinate system, there is defined specifically for each vehicle a curve on which the so-called hip point, related to the human body and the seat, can move in order to guarantee optimum conditions in terms of grasping the steering wheel, reaching switches, operating the pedals, seeing out the windows, and much more. The hip point is defined by the hip joint, constituted by the pivot point of the upper thigh bone in the pelvic bone. The hip point thus constitutes the point which determines the position of the vehicle occupant in the vehicle coordinate system when he or she is seated on the vehicle seat. The hip point and the vehicle seat must be considered in combination, and are critical in terms of developing a seat adjustment apparatus. For example, a heavy person sinks more deeply into a soft seat cushion than does a light person, and different degrees of cushion hardness mean that the same user sinks to different depths.

The hip point of the vehicle driver should always move on the curve (hip point path) arranged relative to the vehicle coordinate system. This curve represents the path of the hip point of standard persons (called "percentiles") commonly used in automotive engineering when those persons are positioned optimally in the vehicle. It should be noted that the hip point of, for example, a short woman (5th-percentile woman) must be positioned toward the front and upward in the woman's viewing direction (usually also the direction of travel), and the hip point of a tall man (95th-percentile man), conversely, toward the back and downward. A plurality of different hip point paths generate a so-called hip point field (H-point field) that is arranged around the hip point path of the standard persons.

In addition to people's different heights, it is found that each person has a different shape; in terms of the aforesaid standard persons, there is a rough division into so-called "seat giants" and "seat dwarfs." "Seat giants" have a long upper body with short legs; "seat dwarfs," on the other hand, have a short upper body with long legs. For most people, therefore, there is necessarily a deviation from the hip point path of the standard persons.

Because it is necessary always to position the hip point in the hip point field, seat adjustment apparatuses such as those disclosed, for example, in the publications DE 32 22 386 A1, DE 40 10 451 C2, and EP 0 445 528 A2 are required.

DE 32 22 386 A1 describes an adjustment apparatus for establishing a hip point path, in which the height adjustment is implemented by means of an inclined plane. In combination with the inclined plane, the seat can be correspondingly positioned using the longitudinal adjustment apparatus carried thereby.

DE 40 10 451 C2 and EP 0 445 528 A2 disclose apparatuses of the aforesaid kind that, for adjustment of the seat position, encompass a four-joint linkage and a displacement apparatus, arranged between the lower seat frame and the vehicle floor, for longitudinal adjustment. In these known adjustment apparatuses, adjustment of the longitudinal position of the vehicle seat relative to the vehicle floor is brought about using a guide rail pair having all the known disadvantages, such as large space requirement, jamming susceptibility, etc.

It is the object of the invention to create an apparatus, and a vehicle seat having an apparatus, for adjusting the vertical and longitudinal position and the inclination of a vehicle seat relative to the vehicle floor of the kind cited initially, making possible an adjustment of the vehicle seat without the use of longitudinal guidance rails. In particular, positioning of the hip point along an unrestrictedly definable travel of at least approximately 200 mm (hip point path) and, in the case of persons deviating from standard dimensions, a correction of the position of the hip point within a vehicle-specific hip point field, are to be possible. The adjustment apparatus is intended to be usable with vehicle seats that can be installed in and removed from the vehicle without tools, by means of special known anchoring devices.

According to the present invention, this is achieved by the fact that the linkage encompasses two linkage parts, each constituted by at least one articulated rectangle, that each have a base, two rockers, and a coupler, the base of the first linkage part being fixed with respect to the floor structure of the vehicle, the coupler of the first linkage part constituting the base of the second linkage part, the coupler of the second linkage part being fixed with respect to the seat part, and a rocker of the second linkage part being coupled in constrainedly kinematic fashion to a rocker of the first linkage part.

By the use of a linkage having the properties recited above, the apparatus according to the present invention can advantageously be embodied so that the seat part travels over a desired pre-settable hip point path. This path corresponds to a so-called coupling point trajectory described by the seat part upon adjustment of the apparatus according to the present invention. In particular, all points on the seat part, fixed with respect to the coupler of the second linkage part, of a vehicle seat according to the present invention that contains an apparatus of this kind according to the present invention can, when viewed in cross section upon adjustment of the first linkage part, preferably upon pivoting of a rocker of the first linkage part, describe a closed integral trajectory;
a trajectory at least approximately 200 mm in length; and
a trajectory that rises, parallel to a longitudinal seat axis, in the viewing direction of a seat user,
i.e. define a desired hip point path with no need for rail guidance of the seat for that purpose.

By the use of a linkage having the properties recited above, the apparatus according to the present invention can advantageously be embodied so that the seat part travels over a desired pre-settable hip point path. This path corresponds to a so-called coupling point trajectory described by the seat part upon adjustment of the apparatus according to the present invention. In particular, all points on the seat part, fixed with respect to the coupler of the second linkage part, of a vehicle seat according to the present invention that contains an apparatus of this kind according to the present invention can, when viewed in cross section upon adjustment of the first linkage part, preferably upon pivoting of a rocker of the first linkage part, describe a closed integral trajectory; a trajectory at least approximately 200 mm in length; and a trajectory that rises, parallel to a longitudinal seat axis, in the viewing direction of a seat user, i.e. define a desired hip point path with no need for rail guidance of the seat for that purpose.

Further advantageous embodiment features of the invention are contained in the dependent claims and in the description below.

The invention will be explained in more detail below with reference to several preferred exemplary embodiments illustrated in the drawings, in which.

In the various FIGS., parts that are identical and, in some cases, also correspond to one another are labeled with the same reference characters and are therefore, as a rule, also each described only once.

Figure 1:
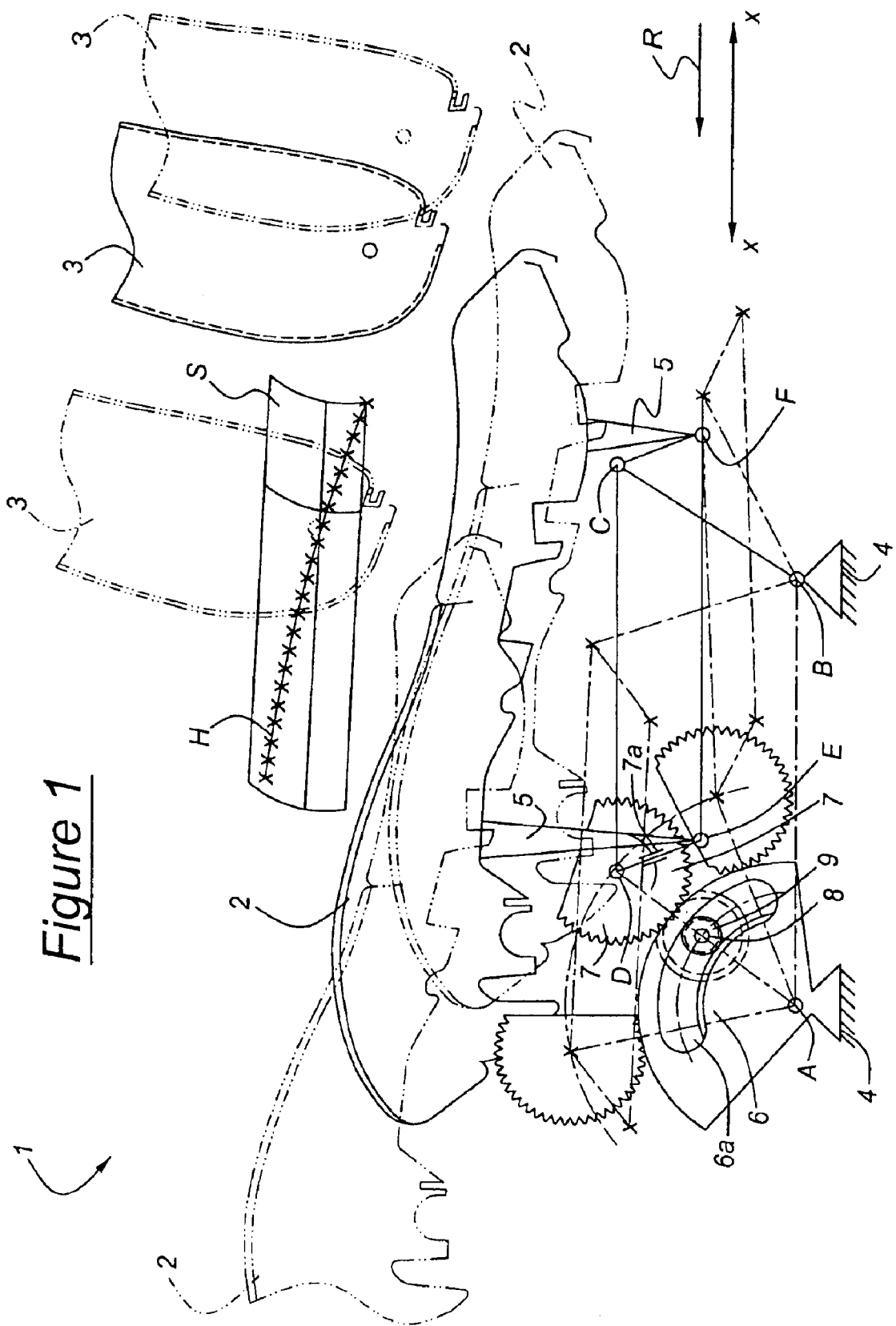
FIG. 1 is a schematic side view of a motor vehicle seat, in various positions, having a first embodiment of an apparatus according to the present invention for adjusting the vertical and longitudinal position and the inclination of a pivotable seat part.

As shown firstly in FIG. 1, a motor vehicle seat 1 according to the present invention comprises a pivotable seat part 2 and preferably a seatback 3. Motor vehicle seat 1 according to the present invention has an apparatus according to the present invention for adjusting the vertical and longitudinal position and the inclination of pivotable seat part 2, which is not labeled further as a whole.

This apparatus has a linkage comprising three linkage parts. A first linkage part is constituted by at least one articulated rectangle ABCD and encompasses a base AB, two rockers AD, BC, and a coupler CD. Base AB is arranged in a plane extending substantially parallel to a longitudinal seat axis X—X, and rockers AD, BC are pivotable about rotation axes extending substantially parallel to a transverse seat axis. (The transverse seat axis, not depicted, extends perpendicular to longitudinal seat axis X—X.). Base AB of the first linkage part is fixed with respect to the vehicle body, in particular with respect to a floor structure 4 of the vehicle, and preferably is constituted by said floor structure 4 itself. Advantageously, rails are not necessary for seat adjustment.

In addition to first articulated rectangle ABCD, the linkage encompasses a second linkage part that is also constituted by at least one articulated rectangle CDEF and has a base CD, two rockers DE, CF, and a coupler EF. As is evident from the drawing, coupler CD of the first linkage part is identical to base CD of the second linkage part, while coupler EF of the second linkage part is fixed with respect to seat part 2 on seat supports 5. A first rocker DE of the second linkage part is coupled in constrainedly kinematic fashion to a first rocker AD of the first linkage part, as will be described in further detail below. Articulated rectangle ABCD of the first linkage part, and articulated rectangle CDEF of the second linkage part, lie substantially in one plane. The articulation points of the two linkage parts are the points A, B, C, D, E, F evident from the illustrative depiction.

Both first articulated rectangle ABCD and second articulated rectangle CDEF preferably constitute parallelograms, thereby imparting to each of them certain advantageous running properties as known to one skilled in the art from a parallel crank mechanism. For example, with a parallel crank mechanism it is possible to enlarge or reduce a flat figure to scale. The rectangle sides AD and BC, and ED and CF, of the two articulated rectangles ABCD and CDEF are not cranks, however, but (as mentioned) rockers, since these linkage parts cannot describe a complete revolution.

In the interest of good stability and uniform action on seat part 2, the first linkage part and second linkage part can preferably each encompass two articulated rectangles ABCD, CDEF, each arranged on either side of the seat part and each identical; the respective rockers AD, BC and DE, CF (depicted only schematically in the drawings) can be constituted as lever pairs arranged on either side of seat part 2. Correspondingly, couplers CD of the first linkage part and bases CD of the second linkage part are respectively constituted by coupler bars arranged on either side of the seat part.

The constrained kinematic coupling of first rocker DE of second linkage part to first rocker AD of the first linkage part is implemented by way of a third linkage part. This third linkage part is embodied as a planetary gear drive having gears 6, 7, 8, 9, or at least gear segments, meshing in pairs with one another and held together by a peripheral flange, the peripheral flange being constituted by first rocker AD of the first linkage part. The third linkage part is embodied as an open external gear drive; its gears 6, 7, 8, 9, or at least gear segments, are embodied as spur gears.

The rotation axis of a first gear 6, or at least tooth segment, of the third linkage part extends through articulation point A, fixed on floor structure 4, of first rocker AD of the first linkage part on base AB of the first linkage part. First gear 6, or at least tooth segment, is at least nonrotatably fixed with respect to floor structure 4 of the vehicle.

The rotation axis of a second gear 7, or at least tooth segment, of the third linkage part extends through movable articulation point D of first rocker AD of the first linkage part on coupler CD of the first linkage part or base CD of the second linkage part.

A third gear 8, embodied as a pinion - - - i.e. with a smaller diameter than the other gears 6, 7, 9 - - - meshes with first gear 6, or at least tooth segment, of the third linkage part, and is arranged coaxially and nonrotatably with respect to a fourth gear 9 that meshes with second gear 7, or at least tooth segment. For third gear 8, there is embodied on the first gear or tooth segment an oblong-hole-shaped guide 6a that results in stabilization of the third linkage.

The third linkage part thus encompasses four gears 6, 7, 8, 9 or at least gear segments, two gears 8, 9 of differing sizes being arranged coaxially and nonrotatably with respect to one another, and each of these two gears 8, 9 meshing with one of the two remaining gears 6, 7 or at least gear segments.

With regard to the constrained kinematic coupling exhibited by the first linkage part and the second linkage part by means of the third linkage part, it should be explained further that this furthermore results from the fact that second gear 7 of the third linkage part is joined nonrotatably to first rocker DE of the second linkage part, so that the latter is entrained (pivoted) in the rotation direction of gear 7. Rocker DE is, however, movable in the radial direction with respect to gear 7. The entrainment is accomplished, as FIG. 1 shows, by way of an entrainment and guidance element 7a.

For adjustment of the apparatus according to the present invention, a rotary drive (not depicted) can be provided for one of the gears, preferably for gear 8 embodied as a pinion. This drive can be embodied, for example, as a stepping mechanism placed centeredly on the rotation axis of gear 8, or as an electric-motor drive acting on the rotation axis.

Alternatively, it is also possible to provide directly a pivot drive for first rocker AD of the first linkage part, although a locking mechanism is then necessary in order to secure the desired position.

The adjustment apparatus according to the present invention operates as follows: When gear 8 embodied as a pinion is rotated counter-clockwise (starting at the position of the seat according to the present invention depicted with bold lines in FIG. 1), gear 9 joined nonrotatably to it then causes gear 7, mounted in the end point of first rocker AD of the first linkage part, to rotate in a clockwise direction. Simultaneously, first rocker AD of the first linkage part is moved in a counter-clockwise rotational direction (about A), and first rocker DE of the second linkage part, which is joined immovably to gear 7 mounted in end point D of first rocker AD of the first linkage part, is moved clockwise (about D). As a result of this motion, coupler EF of the second linkage part, which carries seat part 2, is moved in longitudinal direction X—X of seat 1 and especially in viewing direction R of a seat user, and simultaneously upward, thereby causing it to occupy the position shown on the left side of FIG. 1 with thin lines. Conversely, in the case of a motion of gear 8 embodied as a pinion in the opposite direction, seat part 2 moves into the position depicted on the right side of FIG. 1 with thin lines, downward and opposite to viewing direction R of a seat user. Viewing direction R usually corresponds to the direction of travel of the vehicle, but it is also conceivable, for example, to position a vehicle seat having an apparatus according to the present invention in a vehicle transversely to the direction of travel.

To the extent that seat part 2 is a rigid body, the motion just described and described in the FIGS. is performed by all points on seat part 2 (viewed in cross section) which is fixed with respect to coupler EF of the second linkage part. A curve of this kind is referred to, in the context of the linkage parts used, as a coupling point trajectory. The linkage, i.e. the individual constituents of the first through third linkage parts, can advantageously be dimensioned in a mutually coordinated fashion in such a way that an adjustment of the first linkage part, in particular a pivoting of first rocker AD of the first linkage part, results in an integral, closed, preferably loop-free coupling point trajectory. The dimensioning can additionally be such that the coupling point trajectory can describe at least approximately a length of approximately 200 mm and (as depicted) can rise parallel to longitudinal seat axis X—X in viewing direction R of a seat user. Hip point path H of a point at a defined distance from the surface of the seat part, also shown schematically in FIG. 1, is then obtained as a line equidistant from said coupling point trajectory.

To ensure that as a variant of the curve described, which can preferably be designed for the standard persons described initially, a hip point spectrum (field S in FIG. 1) for persons deviating from the standard ("seat giants," "seat dwarfs") can also be implemented, entrainment and guidance element 7a for rocker DE on second gear 7 can be configured to be adjustable (pivotable) about point D. This can be achieved, in the simplest form, by the fact that entrainment and guidance element 7a is joined to gear 7 via a catch, an index pin, or another suitable positive connection, so that different (discrete) basic positions of entrainment and guidance element 7a with respect to gear 7 can be defined. With this feature, coupler EF of the second linkage part (and therefore seat part 2) can be additionally displaced, in which context the end point of hip point path H is moved, for example, into the lower front region of hip point field S. The possibility also exists of raising the rear part of seat part 2 if necessary.

A further convenient possibility for implementing hip point spectrum S of persons deviating from the standard ("seat giants," "seat dwarfs") consists in providing a further drive, configured similarly to that of the first gear or tooth segment 6 with its oblong-hole guide 6a, for pinion 8. With this, entrainment and guidance element 7a can be moved steplessly about mounting point D in accordance with the needs of the seat user, by manual drive (with a corresponding device to inhibit return motion) or by way of an electric-motor pinion drive.

The invention thus opens up adjustment possibilities for vehicle seat 1 with a plurality of seat positions of seat part 2 that can be set, and is also suitable for coupling with an adjustment apparatus for seatback 3. For example, for adjusting the inclination of seatback 3 an electric-motor drive can be provided that can be put into operation by way of a manually operated switch.

The apparatus according to the present invention makes possible easy and convenient adjustment of the vertical and longitudinal position and the inclination of vehicle seat 2 relative to vehicle floor 4, and is usable in vehicle seats that can be installed into and removed from the vehicle without tools by means of special known anchoring devices.

The illustrative depictions (FIGS. 2 through 7) of the second through seventh exemplary embodiments of the invention are even more schematic than FIG. 1 in that they do not show seat supports 5 and vehicle floor structure 4. In addition, seat part 2 is extended symbolically at its surface into an arrow P that points toward hip point field S and hip point path H that are depicted.

Figure 2:
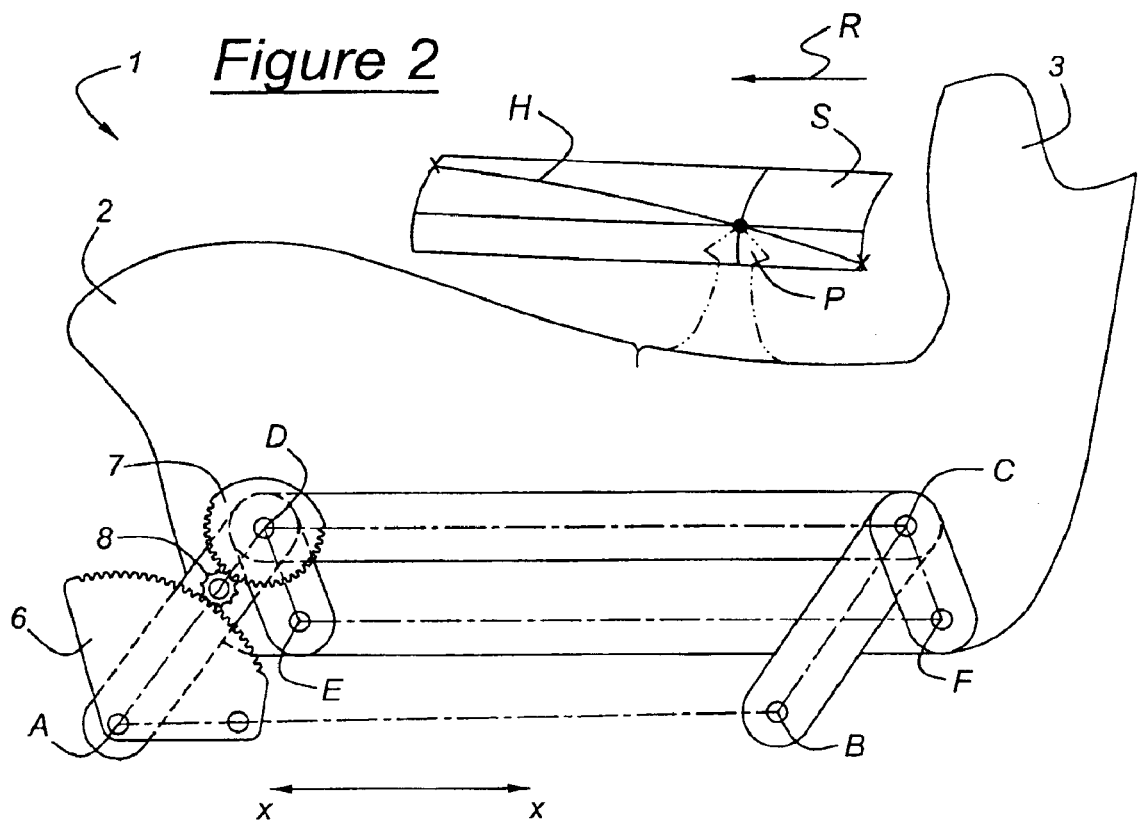
FIG. 2 is an even more highly schematic side view of a motor vehicle seat according to the present invention having a second embodiment of an apparatus according to the present invention.

The second exemplary embodiment of the invention depicted in FIG. 2 is consistent in terms of its configuration with the first exemplary embodiment. In the interest of a more simply designed embodiment, however, the third linkage part here has only three (not four) gears 6, 7, 8 or at least gear segments, one of the gears 8 once again being embodied as a pinion, i.e. with a smaller diameter than the other gears 6, 7, and meshing with the other two gears 6, 7 or at least gear segments. By way of a corresponding mutual coordination of the tooth count and diameter of the individual gears 6, 7, 8, it is thereby possible to establish an optimized conversion ratio and thus achieve the desired motion profile.

The third exemplary embodiment of the invention depicted in FIG. 3 is again consistent in terms of its basic configuration with the first (and the second) exemplary embodiment. Once again in the interest of a more simply designed embodiment, here (in contrast to the first two embodiments) the third linkage part is not embodied as a gear linkage. Instead, it encompasses an additional coupling bar 10 that connects first rocker AD of first articulated rectangle ABCD to second rocker CF of second articulated rectangle CDEF. By this means, in this case the constrained kinematic coupling is brought about between the first and second linkage parts. The articulation points of coupling bar 10 are labeled in FIG. 3 as G (on the one rocker AD) and I (on the other rocker CF), and are each located approximately in a central region of the length of rockers AD, CF.

Coupling bar 10, which could also be referred to as coupling member GI, need not extend parallel to base AB and coupler CD of first articulated rectangle ABCD, just as, in all the embodiments, base AB and coupler CD of first articulated rectangle ABCD need not extend parallel to one another. (The same also applies to rockers AD and BC and, correspondingly, to second articulated rectangle CDEF.)

It is understood that for the case in which the first linkage part and second linkage part each encompass two articulated rectangles ABCD; CDEF arranged on either side of seat part 2, the respective rockers AD, BC; DE, CF being constituted as lever pairs arranged on either side of seat part 2, a respective coupling bar 10 of this kind can also be provided on either side.

Figure 3:
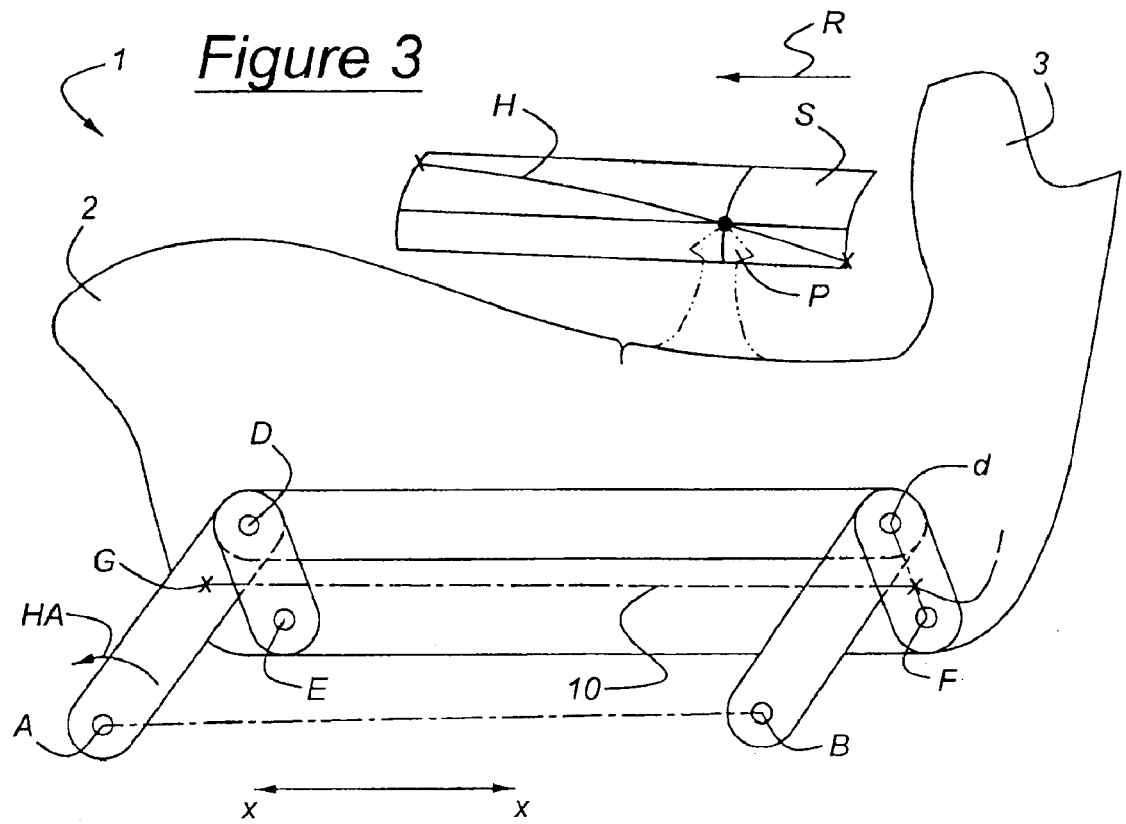
FIG. 3 is a view, corresponding to FIG. 2, of a motor vehicle seat according to the present invention having a third embodiment of an apparatus according to the present invention.
Figure 4:
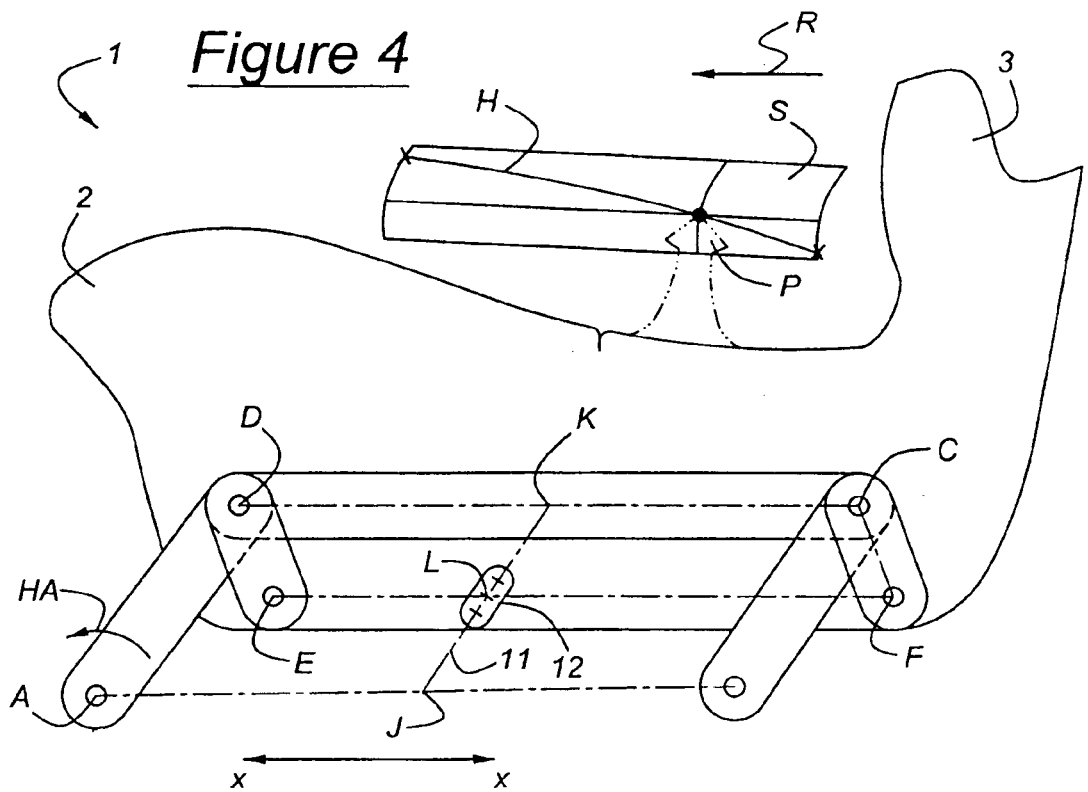
FIG. 4 is a view, corresponding to FIGS. 2 and 3, of a motor vehicle seat according to the present invention having a fourth embodiment of an apparatus according to the present invention.

Since no pinion 8 is provided in this embodiment, another main drive HA must alternatively be provided, for example (as already mentioned) a pivot drive for first rocker AD of the first linkage part. This is indicated in FIG. 3 by the arrow labeled HA.

The fourth exemplary embodiment of the invention (FIG. 4) is also characterized in that in contrast to the first two embodiments, an advantageous simplification of the apparatus according to the present invention is achieved by the fact that what is used as the third linkage part is not a gear linkage, but (as in the third exemplary embodiment) a further lever-like coupling member 11. In contrast to the third exemplary embodiment, however, this additional coupling member 11 joins base AB (articulation point J) of first articulated rectangle ABCD to coupler CD of first articulated rectangle ABCD and to base CD of second articulated rectangle CDEF (articulation point K). It thus acts in the context of the desired kinematic coupling, but in fact as an additional rocker JK. Rocker JK or 11 has a gate 12 that can be joined on the one hand movably on rocker JK in the latter's longitudinal direction, but on the other hand also rotatably (about a mounting point L) to coupler EF of second articulated rectangle CDEF, by which means a kinematic coupling can once again be achieved. As in the third exemplary embodiment, here again a main drive HA must be provided as an alternative to pinion 8.

Figure 5:
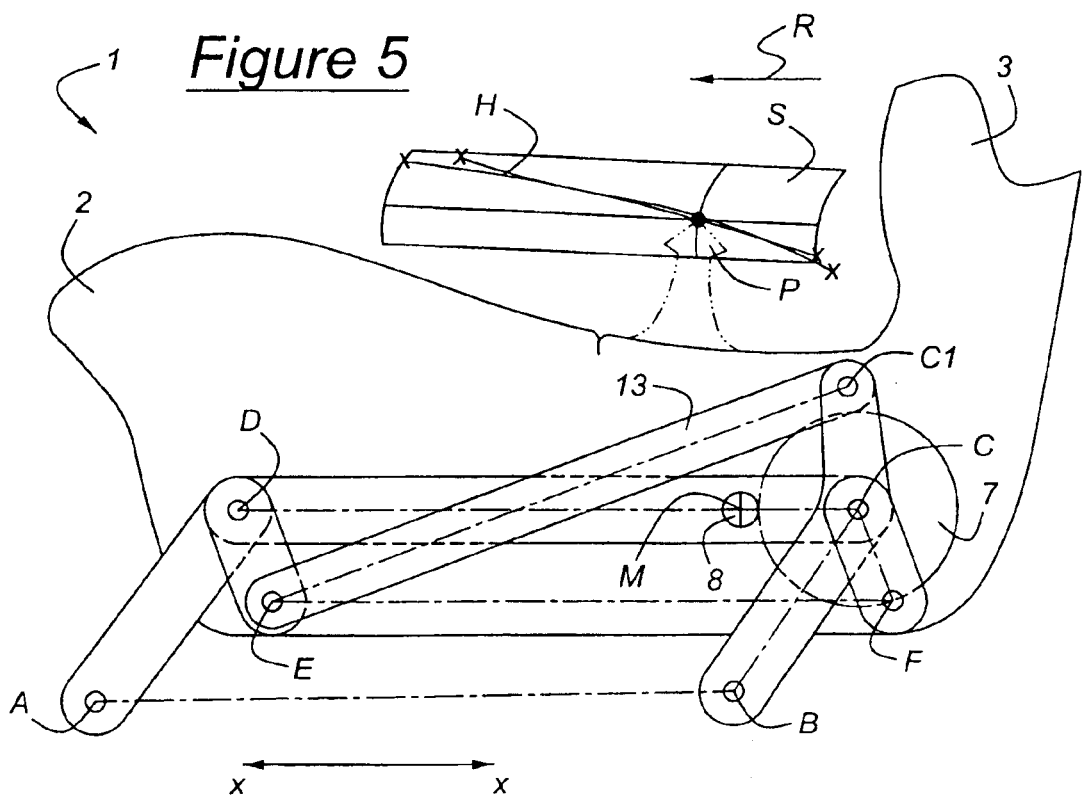
FIG. 5 is a view, corresponding to the preceding FIGS., of a motor vehicle seat according to the present invention having a fifth embodiment of an apparatus according to the present invention.

The fifth exemplary embodiment of the invention illustrated by FIG. 5 is especially similar to the second exemplary embodiment in that it has a reduced number of gears or tooth segments as compared to the first exemplary embodiment. In this embodiment, however, only two gears or tooth segments are provided: a pinion 8, and a gear 7 or tooth segment, corresponding to the second gear or tooth segment of the first and second embodiments, that meshes with pinion 8.

Once again a rotary drive, such as a stepper mechanism placed centeredly on the rotation axis of gear 8 or an electric-motor drive acting on the rotation axis, can be provided for adjustment of the apparatus according to the present invention.

Unlike in the first two embodiments, in this embodiment the larger gear 7 or tooth segment is attached rotatably not in articulation point D, but in articulation point C on the scatback side. Pinion 8 possesses a rotation point M that is secured on coupler CD of the first linkage part (or base CD of the second linkage part). Rocker BC of the first linkage part has, as compared to the other embodiments, an extension CC1 leading beyond articulation point C that can enclose, in particular with portion BC, an obtuse angle (not labeled further) that opens in viewing direction R, as shown in FIG. 5. End point C1 of the extension of rocker BC constitutes, in this embodiment, a first articulation point for an additional coupling member 13 that is articulated at the other end at front articulation point E of coupler EF of the second linkage part.

By means of a corresponding coordination of the tooth count and diameter of gears 7, 8 with another, and of the length of extension CC1 with the length of rocker BC, it is thus possible to establish an optimized conversion ratio and thus achieve the desired motion profile (hip point path H).

Figure 6:
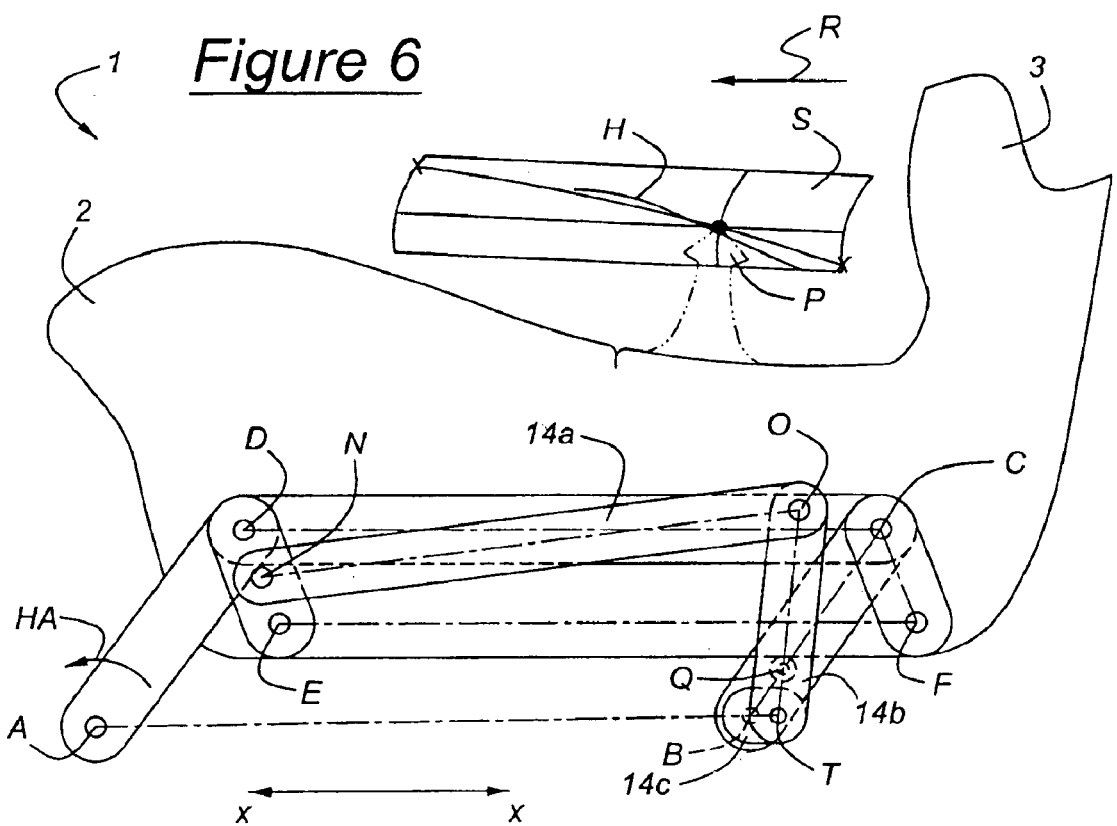
FIG. 6 is a view, corresponding to the preceding FIGS., of a motor vehicle seat according to the present invention having a sixth embodiment of an apparatus according to the present invention.

The sixth exemplary embodiment of the invention shown in FIG. 6 has, like the third and fourth embodiments of the invention, no gears. As in those embodiments, therefore, a main drive HA is necessary; this can preferably act on a rocker AD of the first linkage part.

The constrained kinematic coupling of the first and second linkage parts is created by way of three lever-like coupling members 14a, 14b, 14c joined articulatedly to one another. First coupling member 14a is articulated at one end on a rocker DE of second articulated rectangle CDEF. The articulation point is located in the central region of rocker DE, and is labeled N in FIG. 6. The articulation point at the other end, at the end of second coupling member 14b, is indicated by the reference character O; a further articulation point of second coupling member 14b on a rocker BC of first articulated rectangle ABCD, with the reference character Q; and an articulation point at the other end of second coupling member 14b, at one end of third coupling member 14c, with the reference character T. Third coupling member 14c is articulated at its other end in articulation point B of first articulated rectangle ABCD.

The desired motion profile (hip point path H) is established in optimized fashion here by way of a corresponding coordination of the lengths of the individual coupling members 14a, 14b, 14c with one another and with the lengths of the bases, rockers, and couplers of the two articulated rectangles ABCD, CDEF, and by way of the location of articulation points N, Q of first and second coupling members 14a, 14b on rockers DE and BC. For example, the sum of the lengths of coupling members 14a, 14b, 14c is less than the sum of the lengths of coupler CD and rocker BC of the first linkage part, the lengths of the individual members decreasing in the following order: coupler CD (or base AB)

of the first articulated rectangle (articulated parallelogram) ABCD (greatest length); first coupling member 14a; rocker BC (or AD) of first articulated rectangle ABCD; second coupling member 14b, distance CQ on rocker BC of first articulated rectangle ABCD; distance OQ on second coupling member 14b; rocker CF (or DE) of second articulated rectangle (articulated parallelogram) CDEF; distance EN (or ND) on rocker DE of second articulated rectangle CDEF; distance QB on rocker AB of first articulated rectangle ABCD; distance QT on second coupling member 14b; third coupling member 14c (shortest length).

Figure 7:
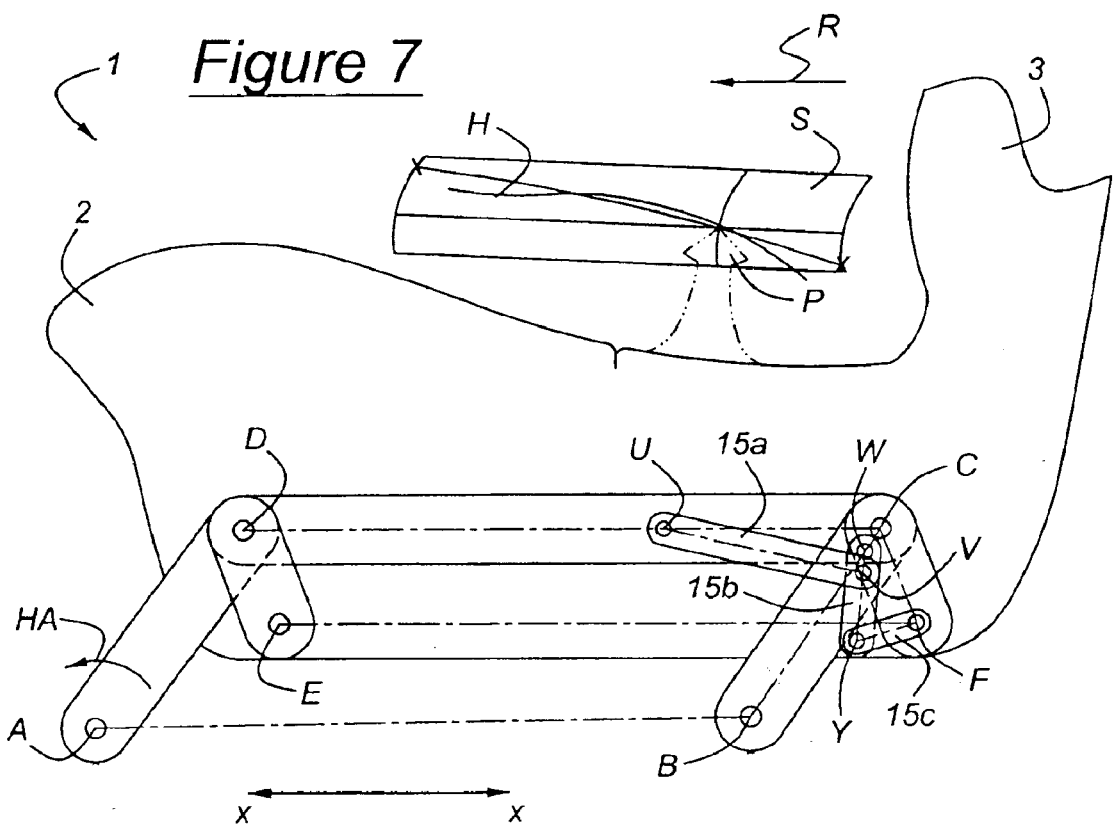
FIG. 7 is a view, corresponding to the preceding FIGS., of a motor vehicle seat according to the present invention having a seventh embodiment of an apparatus according to the present invention.

The seventh exemplary embodiment of the invention depicted in FIG. 7 is very similar to the sixth embodiment of the invention in that it has no gears but once again, for constrained kinematic coupling of the first and second linkage parts, has three lever-like coupling members 15a, 15b, 15c interconnected in articulated fashion. First coupling member 15a is articulated at one end on coupler CD of first articulated rectangle (articulated parallelogram) ABCD or base CD of second articulated rectangle (articulated parallelogram) CDEF. The articulation point is located in the seat-back half of distance CD, and is labeled U in FIG. 7. The articulation point of first coupling member 15 at the other end, on second coupling member 15b, is indicated by reference character V and divides the total length WY of second coupling member 15b into two partial lengths VW, VY that are at a ratio of approximately 1:3 to one another, one end-located articulation point of second coupling member 15b on a rocker BC of first articulated rectangle ABCD having reference character W, and an articulation point of second coupling member 15 at the other end, at one end of third coupling member 15c, being designated Y. Third coupling member 15c is articulated at its other end in articulation point F of second articulated rectangle CDEF.

The seventh embodiment of the invention has the advantage, compared to the sixth embodiment, that the lengths of the individual coupling members 15a, 15b, 15c can be selected to be (altogether) shorter than the lengths of coupling members 14a, 14b, 14c of the sixth embodiment, so that the constrained kinematic coupling of the first and second linkage parts can be embodied in a more material-saving fashion.

The desired motion profile (hip point path H) is once again established in optimized fashion by correspondingly coordinating the lengths of the individual coupling members 15a, 15b, 15c with one another and with the lengths of the bases, rockers, and couplers of the two articulated rectangles ABCD, CDEF, and with the locations of articulation points U, W of first and second coupling members 14a, 14b on coupler CD and rocker BC of first articulated rectangle ABCD, and the location of articulation point V of first coupling member 15a on second coupling member 15b (partial lengths VW, VY). As in the sixth embodiment, the individual length and location relationships are evident, to scale, from the drawing.

The invention is not limited to the exemplary embodiment depicted and described, but rather encompasses all embodiments of similar function as defined by the invention, for example a geometrical coordination among the individual linkage parts that differs from the one evident from the drawings. For example, as has already been made clear, it is possible, in particular by modifying the inclination of individual members of articulated rectangles ABCD, CDEF with one another in their initial positions, but e.g. also that of base AB of first articulated rectangle ABCD with respect to vehicle body structure 4 - - - or also by way of a change in the length of, for example, coupler CD of first articulated rectangle ABCD which simultaneously also represents the base of second articulated rectangle - - - to achieve points in hip point field S that do not lie on the line of hip point path H that is depicted.

For example, in the fifth and sixth embodiments of the invention in particular, points in hip point field S that do not lie on the line of hip point path H that is depicted can be achieved by configuring coupling members 13, 14a to be telescopable and thus adjustable in stepped or stepless fashion to a specific desired length.

For example, in the seventh embodiment of the invention in particular, points in hip point field S that do not lie on the line of hip point path H that is depicted can be achieved by the fact that articulation points U, V of first coupling member 15a on coupler CD of first articulated rectangle ABCD and on second coupling member 15b can be configured to be securable, in stepped or stepless fashion, in different positions. This can in turn be implemented, for example, by means of an index pin, by way of a catch or another positive connection in various discrete basic positions, or steplessly by guidance and clamping or thread-joining of the bearing pins defining articulation points U, V in a groove of coupler CD or of coupling member 15b.

It is important, however, that the constrained kinematic coupling described above be retained in each case, this being understood to mean that the members thereby coupled execute motions that are unequivocally associated with one another.

The invention is moreover so far not to be limited to the combination of features disclosed in the specification, but rather can also be defined by any other desired combination of specific features of all of the totality of the disclosed individual features. This means that essentially practically an individual feature can be omitted or replaced by at least one individual feature disclosed elsewhere.

What is claimed is:

1. An apparatus for adjusting the vertical and longitudinal position and the inclination of a pivotable seat part (2) of a vehicle seat (1) relative to a floor structure (4) of the vehicle, the apparatus having a linkage that comprises:

a linkage part having at least one articulated rectangle (ABCD), that has a base (AB), two rockers (BC, AD), and a coupler (CD), the base (AB) being arranged in a plane extending substantially parallel to a longitudinal seat axis (X—X), and the two rockers (BC, AD) being pivotable about rotation axes extending substantially parallel to a transverse seat axis; and wherein the linkage part comprises two linkage parts, each comprising at least one articulated rectangle (ABCD; CDEF), that each have a base (AB; CD), two rockers (BC, AD; DE, CF), and a coupler (CD; EF), the base (AB) of the first linkage part adapted to be fixed with respect to the floor structure (4) of the vehicle, the coupler (CD) of the first linkage part including the base (CD) of the second linkage part, the coupler (EF) of the second linkage part being fixed with respect to the seat part (2), and one of said rockers (DE, CF) of the second linkage part being coupled in constrained kinematic fashion to the rocker (AD) of the first linkage part.

2. The apparatus as defined in claim 1, wherein the articulated rectangle (ABCD) of the first linkage part comprises a parallelogram.

3. The apparatus as defined in claim 1, wherein the articulated rectangle (CDEF) of the second linkage part comprises a parallelogram.

4. The apparatus as defined in claim 1, wherein the articulated rectangle (ABCD) of the first linkage part and the articulated rectangle (CDEF) of the second linkage part lie substantially in one plane.

5. The apparatus as defined in claim 1, wherein the base (AB) of the first linkage part is constituted by the floor structure (4) of the vehicle.

6. The apparatus as defined in claim 1, wherein the first linkage part and the second linkage part each encompass two articulated rectangles (ABCD; CDEF) arranged on either side of the seat part (2), the respective rockers (AD, BC; DE, CF) being constituted as lever pairs arranged on either side of the seat part (2).

7. The apparatus as defined in claim 1, wherein the coupler (CD) of the first linkage part and the base (CD) of the second linkage part are respectively constituted by coupler bars arranged on either side of the seat part (2).

8. The apparatus as defined in claim 1, wherein the constrained kinematic coupling of the rocker (DE, CF) of the second linkage part with the rocker (AD) of the first linkage part is accomplished via a third linkage part.

9. The apparatus as defined in claim 1, wherein the linkage further comprises a third linkage part that is embodied as a gear linkage.

10. The apparatus as defined in claim 1, wherein the linkage further comprises a third linkage part comprising a planetary gear drive having gear segments (6, 7, 8, 9), meshing with one another in pairs and held together by a peripheral flange, and wherein the peripheral flange comprises the rocker (AD) of the first linkage part.

11. The apparatus as defined in claim 8, wherein the third linkage part comprises at least two gear segments (7, 8), the gear segment (8) having a smaller diameter than the gear segment (7), and meshing with the gear segment (7), and the gear segment (8) being secured in rotationally movable fashion on the coupler (CD) of the first articulated rectangle (ABCD), and the gear segment (7) aligned in a common articulation point (C) of the first articulated rectangle (ABCD) and the second articulated rectangle (CDEF), and the rocker (BC) of the first articulated rectangle (ABCD) having an angled lever extension (CC1) having an end (C1) and a lever-like coupling member (13) articulated at an articulation point (E) of the coupler (EF) of the second articulated rectangle (CDEF).

12. The apparatus as defined in claim 10, wherein the third linkage part is embodied as an open external linkage.

13. The apparatus as defined in claim 10, wherein the gear segments are embodied as spur gears.

14. The apparatus as defined in claim 8, wherein the third linkage part comprises at least three gears (6, 7, 8), the gear (8) being embodied as a pinion gear with a smaller diameter than the other gears (6, 7) and meshing with the other two gears (6, 7).

15. The apparatus as defined in claim 8, wherein the third linkage part comprises four gears (6, 7, 8, 9), wherein two gears (8, 9) of the four gears (6,7,8,9) are of differing size, are arranged coaxially and nonrotatably with respect to one another, and each of these two gears (8, 9) mesh with one of the other two gears (6, 7).

16. The apparatus as defined in claim 15, wherein a rotation axis of one of the two gears (6, 7) of the third linkage part extends through a fixed articulation point (A) and a movable articulation point (C) of one of the rockers (AD, BC) of the first linkage part.

17. The apparatus as defined in claim 10, wherein one of the gear segments is fixed nonrotatably with respect to the floor structure (4) of the vehicle.

18. The apparatus as defined in claim 15, wherein one of the gears comprises a pinion with a smaller diameter than the other gears (6, 7, 9), and meshes with the one of the other gears (6) of the third linkage part and is arranged coaxially and nonrotatably with respect to the gear (9), which in turn meshes with the gear (7).

19. The apparatus as defined in claim 13, wherein one of the gears (6, 7, 8, 9) comprises a pinion drivable by way of a rotary drive.

20. The apparatus as defined in claim 14, wherein the gear (8) comprises a pinion guided in an oblong-hole guide (6a) on the gear (6).

21. The apparatus as defined in claim 19, wherein the rotary drive is embodied as a stepping mechanism placed concentric onto a rotation axis of the pinion.

22. The apparatus as defined in claim 19, wherein the rotary drive is embodied as an electric-motor drive acting on a rotation axis of one of the gears (6, 7, 8, 9).

23. The apparatus as defined in claim 1, further comprising a pivot drive (HA) connected to the rocker (AD) of the first linkage part.

24. The apparatus as defined in claim 9, wherein a gear (7) of the third linkage part is joined nonrotatably, via a part (7a), to the rocker (DE) of the second linkage part.

25. The apparatus as defined in claim 24, wherein the part (7a) is an entrainment and guidance part (7a) and is pivotable on the gear (7) about an articulation point (D) of the rocker (DE) of the second linkage part, and is fixable with respect to the gear (7) that is joined nonrotatably to the rocker (DE) of the second linkage part.

26. The apparatus as defined in claim 24, wherein the part (7a) is an entrainment and guidance part (7a) and is fixable with respect to the gear (7) by an index pin.

27. The apparatus as defined in claim 24, wherein the part (7a) is an entrainment and guidance part (7a) and is steplessly adjustable with respect to the gear (7) by an electric-motor pinion drive, and is fixable by an inhibiting device.

28. The apparatus as defined in claim 1, wherein the linkage comprises a third linkage part comprising at least one lever coupling member (10, 11, 13, 14a, 14b, 14c, 15a, 15b, 15c).

29. The apparatus as defined in claim 28, wherein the coupling member (10, 11) is embodied as a coupling bar (10, GI) that joins the rocker (AD) of the first articulated rectangle (ABCD) to the rocker (CF) of the second articulated rectangle (CDEF).

30. The apparatus as defined in claim 28, wherein the coupling member (10, 11) is embodied as a rocker (11, JK) that joins the base (AB) of the first articulated rectangle (ABCD) to the base (CD) of the second articulated rectangle (CDEF).

31. The apparatus as defined in claim 30, wherein the rocker (11, JK) has a gate (12) movable on the rocker (11, JK) and joined rotatably about at least one mounting point (L), to the coupler (EF) of the second articulated rectangle (CDEF).

32. The apparatus as defined in claim 1, wherein the linkage comprises a third linkage part that comprises three lever coupling members (14a, 14b, 14c; 15a, 15b, 15c) joined articulatedly to one another.

33. The apparatus as defined in claim 32, wherein the coupling member (14a) is adapted to be telescopable.

34. The apparatus as defined in claim 32, wherein the coupling member (14a) is articulated in rotationally movable fashion to one of the (DE, CF) of the second articulated rectangle (CDEF).

35. The apparatus as defined in claim 32, wherein at least one of the coupling members (13, 14b, 14c, 15b) is articulated in rotationally movable fashion on the rocker (BC) of the first articulated rectangle (ABCD).

36. The apparatus as defined in claim 32, wherein at least one of the coupling members (14*c*, 15*c*) is articulated in rotationally movable fashion in an articulation point (E, B, F) of the first articulated rectangle (ABCD) or of the second articulated rectangle (CDEF).

37. The apparatus as defined in claim 32, wherein at least one of the coupling members (15*a*) is articulated in rotationally movable fashion in an articulation point (U) on the coupler (CD) of the first articulated rectangle (ABCD).

38. The apparatus as defined in claims 32, wherein at least one articulation point (U, V) of one of the coupling members (15*a*) is fixable in various discrete or ungraduated basic positions with respect to one of at least one member (CD) of at least one of the articulated rectangles (ABCD, CDEF) or with respect to at least one further coupling member (15*b*).

39. The apparatus as defined in claim 1, wherein all points on the seat part (2) fixed with respect to the coupler (EF) of the second linkage part describe, when viewed in cross section, upon adjustment of the first linkage part and in particular upon pivoting of the rocker (AD) of the first linkage part, an integral, closed, loop-free, coupling-point trajectory.

40. The apparatus as defined in claim 1, wherein the linkage is adapted such that all points on the seat part (2) that are fixed with respect to the coupler (EF) of the second linkage part describe, when viewed in cross section, upon adjustment of the first linkage part and upon pivoting of the first rocker (AD) of the first linkage part, a coupling-point trajectory of at least 200 mm in length.

41. The apparatus as defined in claim 1, wherein the linkage is adapted such that all points on the seat part (2) that are fixed with respect to the coupler (EF) of the second linkage part describe, when viewed in cross section, upon adjustment of the first linkage part and upon pivoting of the rocker (AD) of the first linkage part, parallel to a longitudinal seat axis (X—X), a coupling-point trajectory that rises in a viewing direction (R) of a seat user.

42. A vehicle seat, in particular a motor vehicle seat (1), having an apparatus for adjusting the vertical and longitudinal position and the inclination of a pivotable seat part (2) relative to a floor structure (4), as defined in claim 1.

43. The vehicle seat as defined in claim 42, wherein the pivotable seat part (2) is joined to a seatback (3) arranged pivotably with respect to the seat part (2).

* * * * *